United States Patent [19]

Verschoore

[11] Patent Number: 5,745,537
[45] Date of Patent: Apr. 28, 1998

[54] NEUTRON TUBE WITH MAGNETIC CONFINEMENT OF THE ELECTRONS BY PERMANENT MAGNETS AND ITS METHOD OF MANUFACTURE

[75] Inventor: Gérard Verschoore, Creteil, France

[73] Assignee: U.S. Philips Corporation, New York, N.Y.

[21] Appl. No.: 833,621

[22] Filed: Apr. 8, 1997

Related U.S. Application Data

[63] Continuation of Ser. No. 310,826, Sep. 22, 1994, abandoned.

[30] Foreign Application Priority Data

Sep. 29, 1993 [FR] France .................. 93 11608

[51] Int. Cl.$^6$ ........................................ G21G 4/02
[52] U.S. Cl. ............................... 376/114; 376/108
[58] Field of Search .......................... 376/108, 109, 376/111, 110, 114–117

[56] References Cited

U.S. PATENT DOCUMENTS

| | | | |
|---|---|---|---|
| 4,935,194 | 6/1990 | Verschoore | 376/108 |
| 5,078,950 | 1/1992 | Bernadet et al. | 376/116 |
| 5,112,564 | 5/1992 | Bernadet et al. | 376/116 |
| 5,215,703 | 6/1993 | Bernadet | 376/114 |

FOREIGN PATENT DOCUMENTS

| | | | |
|---|---|---|---|
| 616006 | 3/1961 | Canada | 376/114 |
| 0338619 | 10/1989 | European Pat. Off. | H05H 6/00 |
| 0362947 | 4/1990 | European Pat. Off. | H05H 3/06 |
| 1173450 | 12/1969 | United Kingdom | 376/115 |

*Primary Examiner*—Harvey E. Behrend
*Attorney, Agent, or Firm*—Robert J. Kraus

[57] ABSTRACT

A sealed neutron tube with magnetic confinement of the electrons by permanent magnets. The sealed tube contains a D-T gas mixture under low pressure, fitted with a target, an extraction-acceleration electrode (EAE) and an ion source with 2n Penning cells having anodes in a single cathode cavity and one permanent magnetization system (PMS) per cell. The ions, formed in the ion source, by means of the simultaneous presence of an electric and magnetic field, are accelerated by the EAE and projected onto the target in order to cause emission of neutrons therefrom. In this tube, half (n) of the PMS is magnetized to a nominal value and the other half is weakly magnetized or unmagnetized.

5 Claims, 2 Drawing Sheets

NEUTRON TUBE WITH MAGNETIC CONFINEMENT OF THE ELECTRONS BY PERMANENT MAGNETS AND ITS METHOD OF MANUFACTURE

This is a continuation of application Ser. No. 08/310,826, filed Sep. 22, 1994, now abandoned.

DESCRIPTION a) Field of the Invention

The present invention relates to a sealed neutron tube containing a deuterium-tritium or deuterium-deuterium gas mixture under a low pressure and including an ion source, an extraction-acceleration electrode and a target electrode, the ion source consisting of 2n elementary emission cells of the Penning type, these cells having anodes arranged in a single cathode cavity provided with one extraction orifice per cell along the axis thereof, and each cell including a permanent magnetization system, the ions formed by electron bombardment on the said gas mixture, in the ion source, being channelled by a confinement magnetic field created by the said magnetization systems, extracted through the extraction orifices pierced in the cathode and accelerated by the said extraction-acceleration electrode, and projected onto the said target electrode in order to produce therein a fusion reaction leading to an emission of neutrons.

The invention also relates to a method(s) of manufacture of such a tube.

Neutron tubes of this type are used in the techniques of examining matter by fast, thermal, epithermal or cold neutrons: neutron radiography, analysis by activation, analysis by inelastic-scattering or radiative-capture spectrometry, neutron scattering, etc.

b) Background of the Invention

In order to obtain full efficiency of these nuclear techniques, it is necessary to have longer tube lifetimes for corresponding emission levels, which constitutes, for the present invention, one of the technical problems to be solved.

The fusion reaction $T(d,n)^4He$ delivering 14 MeV neutrons is usually the one most used because of its large cross-section for relatively low ion energies (deuterium-tritium or D-T tubes). However, whatever the reaction used, the number of neutrons obtained per unit charge passing in the beam always increases as the energy of the ions directed towards a thick target itself increases, this being greatly beyond ion energies obtained in currently available sealed tubes supplied by a EHT not exceeding 250 kV.

Among the main limiting factors of the lifetime of a neutron tube, the degradation of the target is dominant under the effect, on the one hand, of the erosion of the target by the ion bombardment and, on the other hand, the local break-up of the target under the effect of the accumulation of the implanted gases which do not diffuse, particularly for tubes with a high emission level.

The erosion depends on the nature of the material, and on the structure of the target, on the one hand, and on the energy of the incident ions and on their density distribution profile on the impact surface, on the other hand.

In most cases, the target consists of a hydridable material (titanium, scandium, zirconium, erbium, etc.) capable of fixing and releasing large quantities of hydrogen without significant alteration of its mechanical behaviour: the total quantity fixed is a function of the temperature of the target and of the hydrogen pressure in the tube. The target materials used are deposited in the form of thin layers, the thickness of which is limited by problems of adhesion of the layer onto its substrate. One way of slowing the erosion of the target consists, for example, in forming the absorbent active layer from a stack of identical layers isolated from each other by a diffusion barrier.

The thickness of each of the active layers is of the order of the penetration depth of the deuterium ions which will strike the target. This technique is known from European Patent Application 0,338,619 which corresponds to U.S. Pat. No. 4,935,194 (Jun. 19, 1990).

Another known way of protecting the target, and therefore of increasing the lifetime of the tube, which is compatible with that indicated in the preceding paragraph, consists in acting on the ion beam so as to improve its density distribution profile on the impact surface: at constant total ion current on the target, which leads to constant neutron emission, this improvement will result from a distribution of the current density which is as uniform as possible over the entire surface presented by the target to the ion bombardment.

In a sealed neutron tube, the ions are in general supplied by an ion source of the Penning type, which has the advantage of being robust, of having a cold cathode (hence a long working life), of giving high discharge currents for low pressures (of the order of 10 A/torr), having a high efficiency and of being small.

The abovementioned drawbacks militate in favour of a multicell type source, that is to say one consisting structure of elementary cells of the Penning type including, for all the cells, a common cathode cavity as described, for example, in the European Patent Application published under the number 0,362,947 which corresponds to U.S. Pat. No. 5,078,950 (Jan. 7, 1992). It will be noted that the operation of the tube takes place at a constant mean current value, $I_{cm}$, this value being linked with a maximum allowable energy dissipation for the tube. A multicell source operating at pressures of the order of $10^{-4}$ torr retains the advantage of a longer lifetime for the tube by more uniform wear of the target, but other problems arise, especially in pulsed operations, for which a repeat frequency F associated with the period T (T=1/F), a cycle ratio or work rate $T_t$ and an initiation delay $\tau$ are defined. The existence of this delay $\tau$ is a parasitic effect of the tube, operating in pressure regulation, which attempts are made to minimize. For the highest pressure values, the peak current increases and the work rate $T_t$ decreases in exactly inverse proportion, to the point that a maximum value $F_{max}$ is reached when the pressure is decreased, owing to the existence of an associated value of $\tau$, which may be problematic because it is then not possible to achieve certain types of pulsed operation (high work rate and frequency) and also because the flicker effect due to random variations in $\tau$ is a maximum. A second problem appears concomitantly for certain operational conditions, this being the difficulty of obtaining a stable pressure regulation loop. This comes from the fact that the pressure is a function of the power 17 of the regulation current $I_r$ of the hydrogen reserve incorporated in the tube, and that it is, under these conditions, difficult to generate a sufficiently small variation step of $I_r$, in view of the range to be covered in a computer controlled system. The invention makes it possible to reduce this drawback by providing the possibility of operation at higher pressure.

One object of the invention is to provide the possibility of doubling the lifetime of neutron tubes without impairing the simplicity of production of these tubes.

Another object is to produce a multicell neutron tube which combines the advantage of a longer lifetime with improved pulsed operation for the highest operational frequencies.

SUMMARY OF THE INVENTION

These objects are achieved and the drawbacks of the prior art are decreased by virtue of the fact that the neutron tube defined in the preamble is noteworthy in that one half (n) of the 2n permanent magnetization systems is magnetized to a nominal value allowing correct operation of the associated cell and the other half (n) is magnetized to a zero or low value which does not allow the associated cell to operate, so as to have a selective ion source magnetization.

In preference, each permanent magnet system extends along the axis of a cell and includes two magnets arranged on either side of the cathode cavity, among which an annular magnet surrounds the extraction orifice.

In preference, the ion source, with single cathode cavity, includes a common cylindrical anode including 2n anode holes, constituting the elementary cells, lying substantially opposite the extraction orifices.

The basic idea of the invention consists in designing an ion source of the Penning type which, instead of including a single elementary cell, includes 2n of them which are used in halves. In order to switch between the sources, the magnetization of the permanent magnets intended to produce the induction field necessary for initiating the discharge is acted on, the electrical supply being common to all of the cells of the ion source, which constitutes the aforementioned simplicity factor.

One practical way of producing the switching consists in initially equipping only n cells of the 2n with magnetization systems magnetized in a given direction, the other n systems not being magnetized, then, at the end of the lifetime of the tube, that is to say when the wear on the target is such that the neutron level is less than the specification, in magnetizing all the magnetization systems in the opposite direction to the original direction, so as to activate the n cells not yet used while neutralizing the first n and thus allowing a second utilization cycle of the tube, with a duration substantially equal to that of the preceding cycle.

From the point of view of the lifetime, questions may be asked as to the advantage of successively activating n elementary cells operating at nominal current instead of simultaneously operating the 2n cells at half current, with a view to obtaining the same lifetime, with the same neutron flux. In continuous operation mode, the 2 solutions might be considered to be equivalent apart from the distribution profile differences of the bombardment density of the target, as a function of pressure.

On the other hand, in pulsed operation—which remains the privileged field of use of a neutron generator, compared to an isotope source—it is necessary to bear in mind the initiation delay of the ion source, which rises when the pressure decreases, which has the consequence of limiting the maximum utilization frequency.

Moreover, this two-stage use need not exclude possible use of the tube with simultaneous operation of all the (2n) elementary sources, which may be advantageous in the following cases, indicated by way of illustration:

To avoid the pressure region in which the operation is unstable. This possibility comes down to increasing the range of use of the tube.

For doubling the output level (without then benefitting from the increase in lifetime) insofar as the thermal dissipation is compatible.

For choosing an operating pressure which promotes the stability of the neutron emission (insofar as the work rate/ operating frequency combination may be satisfied). This is due to the fact that, in pressure regulation mode, the stability of the tube current $$\frac{\Delta I_C}{I_C}$$

depends on the precision of regulation of the reserve current $$\frac{\Delta I_R}{I_R}$$

variably, as a function of pressure:

$$\frac{\Delta I_C}{I_C} = K \frac{\Delta I_R}{I_R}$$

with $13 < K < 56$ depending on the value of the pressure.

The following description, with reference to the attached drawings, all being given by way of example, will clearly explain how the invention can be carried out.

Figure 1A:
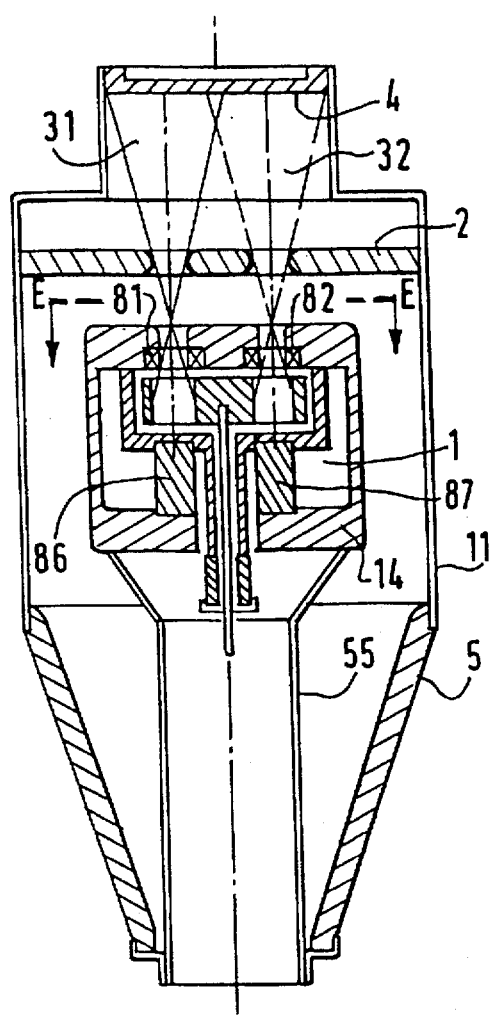
FIG. 1 represents.
Figure 1D:
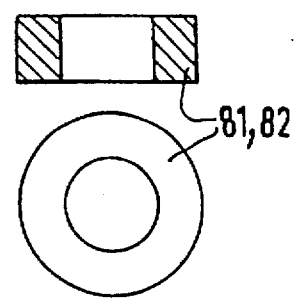
Figure 1C:
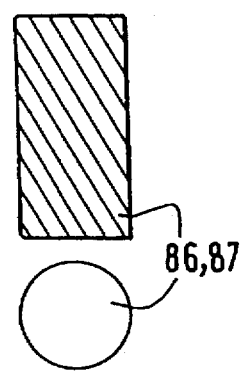
Figure 1E:
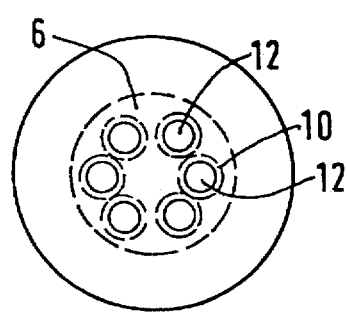

- at A, in elevation and in section, the layout of a sealed neutron tube according to the invention,
- at B, the ion source in FIG. 1A, inverted and enlarged,
- at C and D, the magnets which constitute the magnetization system of each elementary cell,
- at E, the view E—E in FIG. 1A.

Figure 2A:
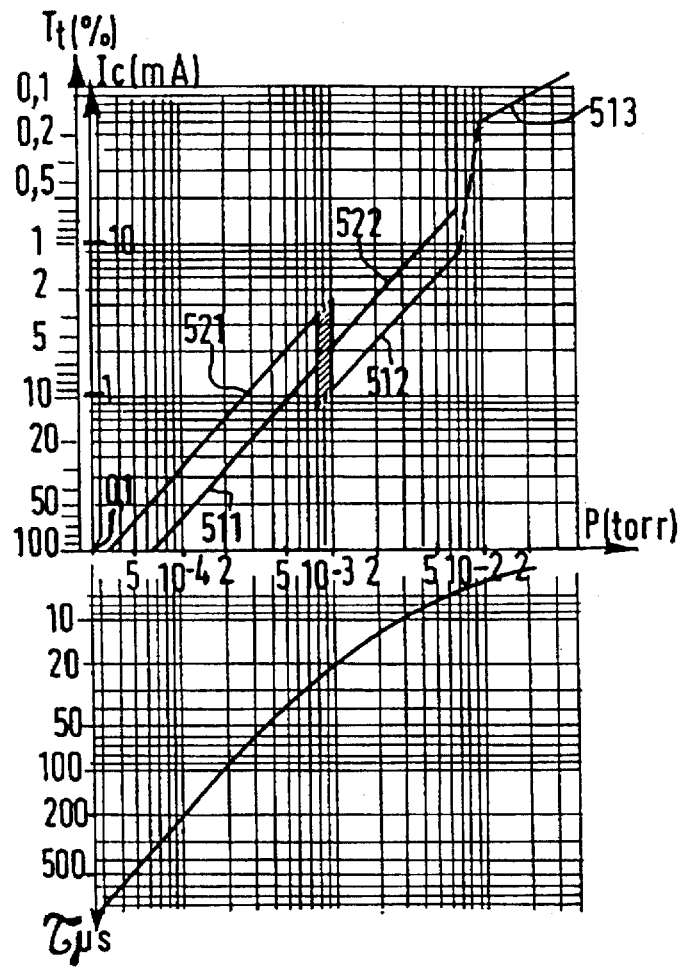
Figure 2B:
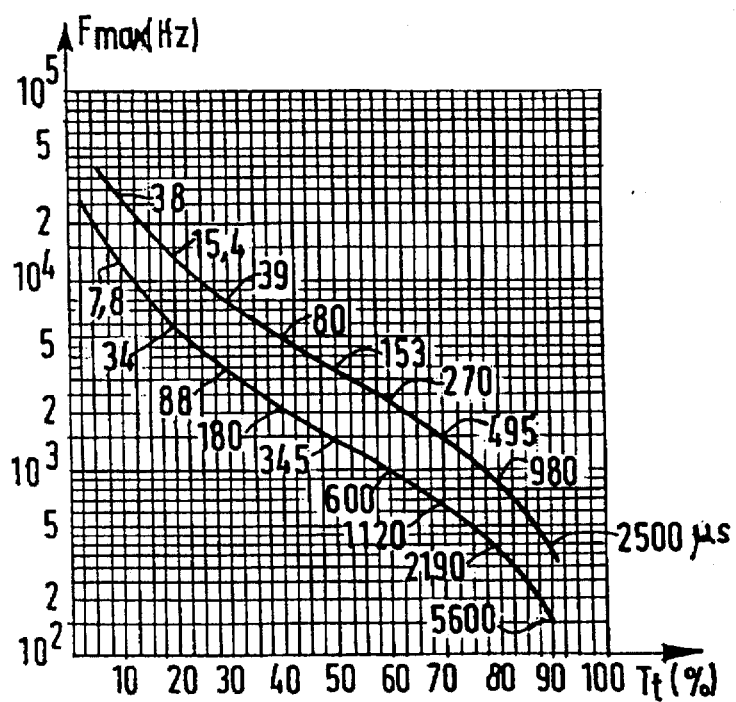

FIGS. 2A and 2B are graphs which indicate the compared operation of a tube of the prior art and of a tube of the invention.

DESCRIPTION OF PREFERRED EMBODIMENTS

The diagrams in FIG. 1 show the main basic elements of a sealed neutron tube 11 containing a low-pressure gas mixture to be ionized, such as deuterium-tritium and which includes an ion source 1 and an extraction-acceleration electrode 2 between which there is a very high potential difference (which may exceed 150 kV), making it possible to extract and accelerate the ion beams 31, 32 and project them onto a target electrode 4 where the fusion reaction leading to emission of 14 MeV neutrons takes place.

Figure 1B:
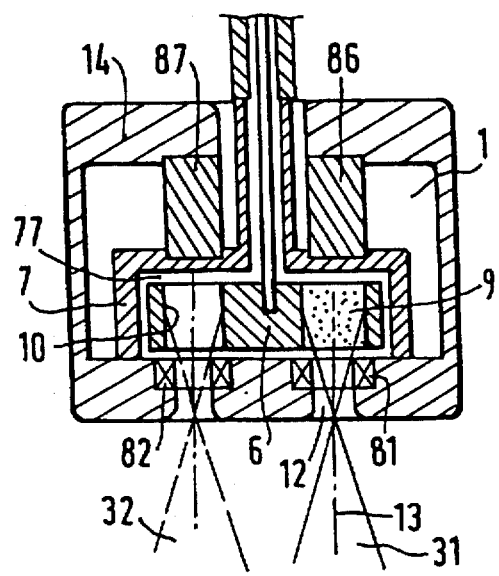

The ion source 1 is represented enlarged and inverted in FIG. 1B. It is integral with an isolator 5 which electrically isolates it from the remaining part of the tube which is complementary to it, and includes an EHT supply terminal 55. This ion source, preferably of the Penning type, consists of at least one cylindrical anode 6, and of a cathode structure 7 which defines a cathode cavity 77 with which a permanent magnetization system is associated. In the figure, this system consists of magnets such as 81 or 82 and 86 or 87, represented enlarged in FIGS. 1D and 1C, with an axial magnetic field which confines the ionized gas 9 in the vicinity of each anode cylinder. An ion emission channel, also called the extraction orifice 12 is made facing each anode cylinder.

The Penning source in FIG. 1 is a multicell source and, for optimized implementation of the invention, it preferably includes an even number, i.e. 2n, elementary emission cells which are all contained in the single cathode cavity 77. Each cell may have its own anode but, in preference, the anode 6 is common, consisting of a metal disk with a thickness of 15 to 20 mm, pierced with the same number of holes 10 as there are cells, each hole constituting an anode cylinder in which electrons oscillate. FIG. 1E, which represents the anode structure in plan view, also shows, in broken lines, the common anode 6, pierced with 6 bores 10 regularly spaced in the circle with an angular pitch of 60°. Opposite each bore 10 there is an extraction orifice 12 represented in solid lines. In FIG. 1B, above each bore 10, a permanent magnet 86, 87 respectively, extends along the axis 13 of each cell, arranged between the cathode 7 and a common yoke 14 which allows the magnetic field created axially in each cell to loop back in each pair of magnets 87, 82 or 86, 81 respectively, which constitutes a permanent magnetization system for each cell. In a multicell Penning source of a known type, it is possible to use, as the permanent magnetization system, a single large permanent magnet arranged in the space which the magnets 86 and 87 occupy in FIGS. 1A and 1B. It will moreover be noted that the direction given to the magnetic field is unimportant for correct operation of the tube, since the function delegated to this field is to give the electrons oscillating in the anode holes helical trajectories aiming to increase the distance covered and thus increase the probability of collision with a hydrogen atom or molecule, which causes the ionization. These trajectories may thus equally well be clockwise or anti-clockwise. In order to implement the invention, it is necessary for each cell to have its own magnetization system, preferably consisting of a pair of magnets on either side of the anode, rather than a single magnet, of type 86 or 87, even if the yoke 14 may for its part remain common to all the magnets. The magnets 86 and 87 preferably have the shape of a cylindrical bar (FIG. 1C) which is approximately 30 mm long and 14 mm in diameter. The magnets 81 and 82 have a cylindrical ring shape with a thickness of 8 mm and an external diameter of 20 mm, approximately. These magnets preferably consist of alnico 1500, the magnetic field to be developed needing to be of the order of 1000 Gauss. Alnico has the advantage of withstanding high temperatures (of the order of 400° C.) without induction loss. This makes it possible to reduce the oven time for degassing before sealing the ion source fitted with its magnets in the tube. Other types of magnets, such as samarium magnets, are more powerful but, in the current state of the technology, they lose their magnetization above a certain temperature (200° C. for samarium magnets). Samarium magnets might, however, be usable for implementing the invention by decreasing the oven temperature while increasing the duration thereof.

Normally, for a neutron tube of the type shown in FIG. 1, the magnets are fitted in the neutral state in the yoke 14 with the other elements 6, 7 already described, and this subassembly is in turn arranged in the tube 11, inside which a partial vacuum is established (after degassing) and which is then sealed. It is only at this stage that the magnetization of the magnets is carried out, in the known art, the tube being placed on a magnetization bench. This magnetization is carried out in a single step, and to saturation, by means of an induction coil arranged around the tube, through which a sufficiently long magnetization current pulse flows.

According to the invention, on the other hand, magnetization is carried out first and discriminately, only half n of the magnets being previously magnetized (to saturation), while the other half is left in the neutral state, before mounting in the yoke 14. The mounting of the tube is then carried out as indicated hereinabove, but there is no other magnetization phase before the tube is put into use. It will be noted, however, that, in the tube according to the invention so shaped, it remains possible to magnetize the magnets from then on incorporated in the tube, in either direction, by magnetization of the tube when placed on an ad hoc magnetization bench. In FIG. 1 the previously magnetized (activated) magnets are labelled 81, 86, while the magnets such as 82, 87 are left in the neutral state. In preference, the pattern of the activated magnetization systems (of type 81 and 86) is regular, within the ion source 1, being complementary and fitted exactly into the pattern of the unactivated magnet systems (of type 82 and 87). For example, as represented in FIG. 1, 6 magnetization systems are distributed along the generatrices of a cylinder with an angular pitch of 60°, so that one activated magnetization system alternates with one unactivated magnetization system. The magnetization systems are mounted in the tube with a given magnetization direction which is the same for all of them.

When this tube according to the invention is placed in operation, only the ion sources where there is a sufficiently high magnetic field, generated by the magnets 86, 81, can operate. In the other sources, the path of the electrons is insufficient to initiate the production of ion-electron pairs, these latter electrons being capable in turn of producing other ion-electron pairs. In fact, in the absence of a magnetic field, the electrons are captured by the anode without oscillating. Their path is too short to have a significant probability of producing an ionization.

A tube is thus obtained which is equivalent to a multicell tube with n ion sources. At the end of an operating time equal to T (several hundreds to several thousands of hours depending on the output level required) the tube reaches the end of its lifetime, because, at the location of the centres of impact of the ion beams on the target where the ion bombardment is the strongest, the target is worn to the point that the output level for which it had been set has dropped considerably. According to the invention, the n-source tube is restored to a new initial operational state by expediently produced remagnetization which deactivates the n ion sources previously active and which activates the other n ion sources. For this purpose, the tube should be placed on the magnetization bench and receive a magnetization pulse, in the opposite direction to the said direction given to the n sources previously activated, with an intensity capable of cancelling, to a first order, the magnetization of the latter. At the same time, the n sources, which had until then been in the neutral magnetic state, acquire a magnetization in the opposite direction to the said given direction. It will be noted that, during this (final) magnetization phase, the n activated magnetization systems should not be magnetized to saturation, at the risk of obtaining a tube with all 2n magnetization systems activated in the same (new) magnetization direction. However, although the risk of perforation of the substrate of the target is excluded, it is nevertheless possible in this latter case to regain the nominal neutron output level, at the price of a double current, insofar as the generator is capable of handling the current required and the tube can accept double thermal dissipation. The n-source tube according to the invention can thus be used for another time period equal to approximately T.

A multicell tube (with n sources) is thus obtained, all other things being equal, especially the internal pressure, whose lifetime is twice that of a multicell tube (with n sources of the known art). It should also be noted that the magnetization of the tube carried out at half-lifetime requires fairly high precision as regards the new magnetization state desired for all the magnets. In this scope it is favourable, for avoiding magnetization dispersion, to use magnets which have characteristics which are as close as possible to each other and, preferably, magnets from one and the same batch.

It is indicated hereinabove that, during the so-called final magnetization of the tube, the n activated magnetization systems should not be magnetized to saturation. In order to compensate for this slight drawback, which would result in n new ion sources with an output less than that of the n sources initially active, provision may be made, as a variant, to over-dimension magnets of the type 82, 87 in proportion to this magnetic unsaturation.

In addition, it must be borne in mind that the quantity of neutrons which can be emitted by a tube is directly linked to the quantity of (for example) tritium which the target can store in its active layer (or layers). This consideration may lead to comparison of the tube according to the invention with a tube of the prior art with 2n ion sources (that is to say tube according to the invention but in which all of the sources were magnetized at the same time, before first use) in which each source operates at a target (ion) current which is halved compared to the sources described hereinabove (i.e. $I_c/2n$ instead of $I_c/n$), but for twice the length of time, that is to say 2T. In comparison to the tube according to the invention, the same total target current, $I_c$, is obtained, to a first order, and therefore the same neutron flux, and the same lifetime, equal to 2T in both cases. This comparison shows that the advantages of the invention are only partially linked to the neutron flux of the tube or with its lifetime, and therefore weakly linked with the total number of neutrons which the tube is capable of emitting during its lifetime. In contrast, a marked advantage appears, linked with the fact that the tube according to the invention operates at substantially twice the pressure of the multicell tube with 2n ion sources of the known art, this advantage being reserved for pulsed operation (or in pulses).

In pulsed operation, an initiation delay τ is produced on each pulse. This delay, which rises when the pressure in the tube decreases is furthermore increasingly problematic in proportion to its fluctuation, from one pulse to the next (flicker phenomenon). For a target current $I_c$ and an actual work rate $T_r$ (expressed in %) which are given, there is therefore an upper limit to the maximum operating frequency of the tube which it is possible to reach. The advantage of an enhanced pressure in pulsed operation, in order to reduce the duration τ, appears above all for neutron tubes of the deuterium-deuterium (D-D) type, for which initiation is more difficult because the electron "seeds" which promote this initiation are rarer there than in the deuterium-tritium (D-T) tube where a partial pressure of tritium exists in the closure of the tube, and delays τ and fluctuations in these delays result which are much greater than for the D-T tube (for equal pressure in both tubes).

FIG. 2A is a double graph which indicates, with logarithmic coordinates, for a deuterium-tritium tube, the relationship which exists between the main parameters (mentioned above) characterizing the tube in pulsed operation. On the upper graph, the curve with 3 segments, representing the tube according to the invention, is labelled 511, 512, 513, while the curve (with 2 segments) for the equivalent tube according to the known art (2n ion sources) is labelled 521, 522. By looking only at the first segment of each curve, 511 and 521 respectively, the graph in FIG. 2B can be derived from FIG. 2A, in which graph the curve of the maximum frequencies $F_{max}$ relating to the invention is labelled 515 and that relating to the known art is labelled 525

$$\left( F_{MAX} = \frac{1 - T_r}{\tau} \right)$$

Each curve, parameterized in neutron pulse length values $t_i$ in μs, places an upper boundary on the operating frequency range which it is physically possible to obtain with either tube. It will be observed that the maximum operating frequencies $F_{max}$ which provide the points on the curves 515 and 525, are more than doubled, for the invention compared to the known art.

The invention applies to neutron tubes of the D-D type or of the D-T type. The invention is compatible with other improvements aiming to increase the lifetime of the target and consequently of the tube. Mention may be made, in particular, of the tube having a target with several active layers, described in European Patent 0,338,619 already indicated hereinabove.

In order to improve the lifetime of a multicell neutron tube of the type described hereinabove in the first paragraph, it might also be envisaged to use several elementary ion sources supplied electrically individually in turn. It would therefore be equivalent, as regards the desired result, to have discriminate electrical supply for the anode polarization of the cells. However, the production of such a tube, while it might be envisaged, would lead to much more complex production than for the discrimination between magnetic fields, given the problems of producing the core of the elementary cells, with the linked electrical isolation problems.

I claim:

1. A method of increasing the operating lifetime of a sealed neutron tube containing a deuterium-tritium or deuterium-deuterium gas mixture under low pressure and having a Penning ion source with 2n elementary emission cells, an extraction-acceleration electrode and a target electrode, each of said elementary emission cells including at least one individual permanent magnet associated uniquely with said each elementary emission cell for forming a confinement magnetic field that channels ions formed in said each elementary emission cell to said extraction-acceleration electrode for bombardment of said target electrode, comprising the steps of:

magnetizing a first half of said permanent magnets to a nominal value that allows correct operation of the emission cells associated with said first half of said permanent magnets and, magnetizing a second half of said permanent magnets to a zero or low value that does not allow correct operation of the emission cells associated with said second half of said permanent magnets, operating said neutron tube during a first portion of the operating lifetime thereof with said first half of said permanent magnets being magnetized to said nominal value and said second half of said permanent magnets being magnetized to said zero or low value, magnetizing said second half of said permanent magnets to be nominal value that allows correct operation of the emission cells associated with said second half of said permanent magnets and, magnetizing said first half of said permanent magnets to a zero or low value that does not allow correct operation of the emission cells associated with said first half of said permanent magnets, operating said neutron tube during a second portion of the operating lifetime thereof with said second half of said permanent magnets being magnetized to said nominal value and said first half of said permanent magnets being magnetized to said a zero or low value.

2. The method of claim 1 wherein the first half of said emission cells are active and the second half of said emission cells are passive during the first portion of the operating lifetime and the second half of said emission cells are active and the first half of said emission cells are passive during the second portion of the operating lifetime.

3. The method of claim 1 wherein the neutron tube is operated in a pulsed mode of operation.

4. The method of claim 1 wherein the first half of the permanent magnets are magnetized to the nominal value and the second half of the permanent magnets are magnetized to the zero or low value during manufacture of the neutron tube.

5. The method of claim 4 wherein the second half of the permanent magnets are magnetized to the nominal value and the first half of the permanent magnets are magnetized to the zero or low value after manufacture of the neutron tube by applying a magnetizing field to the neutron tube.

* * * * *